(12) United States Patent
Majumdar et al.

(10) Patent No.: US 7,332,047 B2
(45) Date of Patent: Feb. 19, 2008

(54) ADHERENT, REMOVABLE BARRIER FILM FOR TIRE CARCASS

(75) Inventors: Ramendra Nath Majumdar, Hudson, OH (US); Brian Matthew Logan, Akron, OH (US); Lewis Timothy Lukich, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 182 days.

(21) Appl. No.: 10/308,773

(22) Filed: Dec. 3, 2002

(65) Prior Publication Data

US 2004/0103967 A1   Jun. 3, 2004

(51) Int. Cl.
*B29D 30/00* (2006.01)
*F16F 15/34* (2006.01)

(52) U.S. Cl. .................. 156/75; 152/154.1; 156/110.1; 156/247

(58) Field of Classification Search ............. 152/152.1, 152/510, 154.1, 504, 524, 525, DIG. 16; 156/123, 133, 110.1, 247, 249, 289, 344, 156/75; 264/315, 326
See application file for complete search history.

(56) References Cited

U.S. PATENT DOCUMENTS

| | | | | |
|---|---|---|---|---|
| 2,035,631 A | * | 3/1936 | Wood | 229/400 |
| 2,245,355 A | * | 6/1941 | Mullen | 156/75 |
| 3,285,314 A | * | 11/1966 | Roberts | 152/524 |
| 4,443,279 A | * | 4/1984 | Sandstrom | 156/123 |
| 4,744,851 A | * | 5/1988 | Lorenz | 156/289 |
| 4,816,095 A | * | 3/1989 | Taylor | 156/96 |
| 5,044,411 A | * | 9/1991 | Doll | 152/208 |
| 5,127,811 A | * | 7/1992 | Trethowan | 425/32 |
| 6,217,683 B1 | * | 4/2001 | Balzer et al. | 156/60 |
| 6,235,376 B1 | * | 5/2001 | Miyazaki et al. | 428/203 |
| 6,244,104 B1 | | 6/2001 | Koch et al. | |
| 2003/0211273 A1 | * | 11/2003 | Perry et al. | 428/41.8 |

FOREIGN PATENT DOCUMENTS

JP    2002-012002 A  *  1/2002

* cited by examiner

*Primary Examiner*—Geoffrey L. Knable
(74) *Attorney, Agent, or Firm*—Henry C. Young, Jr.; Alfred D. Lobo (57) ABSTRACT

A bond of a rubbery component to a virgin surface of a tire's cured innerliner which virgin surface has never been contaminated by the remnants of a release agent left after buffing with a wire brush and solvent-cleaning the cured innerliner, is unexpectedly stronger than a bond of the component to the contaminated but "cleaned surface", cleaned as indicated. As an alternative, buffing with a wire brush results in a textured surface that impairs adhesion of a balance pad. Therefore, a pneumatic tire is provided with a virgin surface protected against contamination by a release agent at the curing temperature of the tire; protection is provided by a self-supporting barrier film of sulfur non-vulcanizable, expandable, thermoformable synthetic resinous material; and, a method is provided for maintaining a virgin cured surface within all or part of either the exterior or interior of a pneumatic tire's rubber carcass which is conventionally cured. The barrier film which is substantially inextensible at ambient temperature, is removable without tearing into pieces from the protected surface of the cured tire. When the interior surface is provided by an innerliner, any component to be included within the interior of the carcass may be adhesively secured to the virgin surface of the innerliner more securely than has been heretofore possible.

1 Claim, 2 Drawing Sheets

ADHERENT, REMOVABLE BARRIER FILM FOR TIRE CARCASS

FIELD

This invention relates to preventing contamination of either the exterior surface or the interior surface of a conventional toroidal uncured ("green") carcass of a rubber tire, by a release agent used in a curing press. When the carcass is cured, either the innerliner ("tire liner"), or an innerliner-free green tire carcass, or the tread, or the sidewalls, or all, or any combination of the foregoing are protected against contamination by the release agent.

BACKGROUND OF THE INVENTION

All carcasses of pneumatic green tires are built as a series of layers of flexible high modulus cords encased in a low modulus rubber; the cords in each layer are oriented in a chosen path or direction and substantially equispaced and parallel. The tire, whether belted radial ply or bias ply, is cured in a curing press using a curing bladder which forces expansion of the tire. When the carcass is cured with an innerliner in it, as it usually is, the innerliner expands with the carcass which is forced against the indentations in the curing mold to form the tread, and all components are co-cured so as to provide a substantially cohesive bond between one and another.

Expansion upon curing of a radial ply tire is small, in the range from about 2% to 20% greater than the size of the green carcass; but expansion of a bias ply tire may range from 20% to 250% or more. Since, at present, a release agent is already provided on the surface of the curing bladder, and/or on the inner surface of an innerliner, using a self-supporting film of solid polymer to function as an additional release agent is contraindicated because it is unnecessary.

An innerliner for a pneumatic tire is typically formed from a compound containing a major proportion by weight of a halobutyl rubber. Before the tire is cured, the entire original inner surface of the innerliner and/or the outer surface of a shaping bladder used in the curing press, is coated with a release agent. The release agent is commonly referred to as a "lining cement" when used on the surface of the innerliner; and, to a "bladder lube" or "bladder spray" when used on the shaping bladder. Some tires are cured without an innerliner because it will be applied, typically by spraying, after the tire is cured.

In this invention, the tire carcass is provided with an adherent, removable, self-supporting solid barrier film or layer of specific synthetic resinous compounds, which film protects the original interior rubber surface of the carcass under the film, or the tread under the film, or the sidewalls under the film, from contamination by release agent.

The surface of the innerliner, or the interior surface of an innerliner-free green carcass, or the exterior surface of the tread, or the exterior surface of the sidewall, protected so as never to have come in contact with release agent, is referred to as a "virgin surface" whether it is cured or not. Such a virgin surface permits a rubbery article to be bonded to it without having to clean the surface; at the present time, such bonding to a contaminated surface is typically done after cleaning it, first by buffing with a wire brush in combination with an appropriate solvent, followed by vacuuming the solvent. Such cleaning is necessary to remove the lining cement or bladder spray (release agent), typically an organopolysiloxane—or "silicone"—based material such as poly (dimethylsiloxane) including powdered mica or crystalline silica and afford a "cleaned surface". Cleaning is both time-consuming and environmentally unfriendly, since the solvent is non-aqueous and aggressive; moreover, its use is restricted. Nevertheless, before automobile tires are provided with a puncture sealant, applied to the inner surface of a cured innerliner, it must be thoroughly cleaned. Cleaning to get rid of contaminating release agent so as to provide a "cleaned surface", has been done over several decades, and is still done.

Alternatively, and less preferably, the release agent may be removed by washing with an appropriate detergent, or mechanically, by buffing or abrading the surface until the contaminant is removed. Since tire manufacturers were enured to the disadvantages and additional cost of a cleaning step, they were unaware that bonding a rubbery tire component to a cured virgin surface of a tire provides an unexpectedly stronger bond than bonding to a "cleaned surface", even if it is meticulously buffed and solvent-cleaned.

Even a small aircraft tire 450-190-5 (450 mm diameter, 190 mm width and 5" or 127 mm bead diam.) of bias ply construction typically requires an average of about 235 ml of an environmentally unfriendly solvent; at present, solution of the problem appeared to mandate finding a less objectionable solvent.

A carcass of a pneumatic rubber tire, whether a radial or bias ply, is often required to have a rubbery component bonded to a portion of the tire's surface, either exteriorly on the sidewall, or internally within the toroid. For example, an aircraft tire, typically of bias ply construction, is dynamically balanced by adhering a laminar pad of rubbery material, referred to as a "balance pad", symmetrically about the circumferential centerline of the interior surface of the cured tire. However, because the precise position at which the balance pad is to be adhesively secured, cannot be determined until the tire is cured and dynamically balanced, the midportion of the entire inner liner is cleaned.

A balance pad, such as one commercially available from Patch Rubber Company, is a multilayer rubbery component which typically includes (i) a thick layer of high specific gravity compound blended with iron oxide and cured, the thickness being a function of the weight desired, (ii) a relatively thin layer of high elongation floater gum or stretch ply of rubber filled with carbon black, (iii) a bonding gum layer (also referred to as a "gray-face gum" layer) of curable rubber compound with curing agent but without a cure accelerator or activator fluid, and (iv) a protective film covering the bonding gum layer. When the protective layer is removed from a balance pad of desired weight, and the exposed bonding gum layer is secured with a fast-dry cement containing a cure-accelerator, typically an alkylamine or aralkylamine, to the rubbery surface of a cured innerliner, or of an innerliner-free cured carcass, the curing of the bonding gum layer to the rubbery surface, typically at ambient temperature over a period of several days, ensures that the balance pad will not be dislodged during operation of the tire. However, since one cannot know in advance where the balance pad will need to be positioned, the entire surface of the innerliner must be clean.

Another example of a cured tire requiring a cleaned surface is that of a "smart" tire in which an electronic monitoring device is to be secured. Such a device is used to record the operating history of a tire including temperature and pressure, distance travelled, impacts sustained, and other data, to transmit the data to the driver or to a designated receiving station, and to do so without taking the tire out of service. A typical monitoring device includes a passive integrated circuit and antenna encapsulated and non-removably secured within a tire, the device being activated by a radio frequency transmission that energizes the circuit by inductive magnetic coupling. Such devices of numerous configurations and types currently being used have a common requirement, namely, that each be so securely mounted within the tire that it will tolerate any condition to which the tire is subjected without being dislodged. The problem is that flexure of the tire, and particularly of its tread and sidewall, results in dislodging the device.

This problem has been addressed in U.S. Pat. No. 6,244,104 to Koch et al by supplying a patch having several layers; the uncontaminated layer to which the monitoring device is to be secured is not the virgin surface of the innerliner. They provide a protective flexible layer of Mylar® polyethylene terephthalate film, plastic, metal foil, metal screen or a polyurethane over a cure cloth (or cure paper) to prevent an uncured rubber layer from curing into the cured rubber layer. To provide temporary protection against contamination of the uncured rubber layer before the patch is placed on a desired are and co-cured with the tire, a protective film of polyethylene ("PE") is used.

Koch et al recognized that, to ensure a cured inner surface free from trace amounts of remnants of a release agent, by far a better choice than cleaning the contaminated surface, with or without a solvent, was to provide an additional uncured rubber layer protected from contamination in a patch. The patch provided a newly added uncontaminated cured rubber surface over the virgin surface of the innerliner directly cured to the protective patch with its curable rubber layer. Koch et al do not "protect" any portion of the surface of the innerliner before it was cured; they provided an additional cured surface superimposed upon the cured innerliner.

To protect the entire virgin surface of either a portion of the exterior surface of the tire, or an innerliner, logic dictated that the virgin surface be protected from a conventional release agent in the first place, and that this be done by a removable barrier film between the curing bladder and the virgin surface while the tire was being cured, the barrier film to be readily removable after curing.

The Problem

The problem is implementing the logical choice, that is, to counter contamination of the entire innerliner surface by the already-present release agent at a temperature in the range at which the tire is to be cured; in some instances only a minor portion of the innerliner may need to be protected. Choice of a barrier film dictated that it be heat-resistant in that temperature range, typically from about 121° C. (250° F.) to 200° C. (392° F.).

Further, expansion of a green carcass in the curing press dictates that, to protect a major portion of the innerliner's surface, the barrier film be extensible at least 2% at curing temperature in any direction on the surface the barrier film is to protect, and to stretch during curing without tearing. A green belted radial ply tire for an automobile expands in the curing press in a range from about 1% to 20%; a conventional green cross bias casing of a bias ply tire with a crown angle in the range from 20° to 38° expands in the curing press in a range from about 20% to 250%, expansion of aircraft tires being greatest. Therefore a usable barrier film is required to be adequately expandable within the curing carcass, that is, multiaxially expandable, without tearing in the range from about 5% to 100%. The barrier film is also required to be adequately thermoformable, in that it conforms to the shape of the bladder during curing, thus squeezing out entrapped air, and after being thermoformed the film substantially retains its formed shape as the film has essentially no memory and is non-elastomeric. Still further, to be manually readily removable, it is essential that the barrier film not fuse to itself when overlapped and heated. In the instance when the entire virgin surface is to be protected, one end of the barrier is overlapped over the other (which other end is applied or "stitched" to the virgin surface to be protected) so as to form a "pull-tab" for easy removal.

Efficiently curing a tire requires that heat transfer from the bladder be attenuated as little as possible; this mandates using a relatively thin film of polymeric material. Though it is possible to calender natural and synthetic hydrocarbon rubbers to as thin as 0.305 mm (0.012" or 12 mils), then partially or fully pre-cure them for use as barrier films, they do not lend themselves to being reliably calendered into a sheet less than 0.762 mm (0.03" or 30 mils) thick. When so calendered and essentially fully cured, the cured rubber is difficult to stitch into the green innerliner, and fails reliably to withstand the expansion of a curing bladder, first at ambient or relatively low temperature, then in a hot mold, without tearing. When partially precured and having some tack, for easy positioning, the cured rubber strip is not readily integrally removed; that is, in a single piece without tearing into two or more pieces as it is being removed.

Since it is self-evident that the barrier film is to be positioned either on, or within the green tire, and that its position be maintained until it is loaded into the curing press, the requirement that the virgin surface be maintained as such, dictates that no adhesive be used to position the barrier film within the green carcass, or on the exterior surface of its sidewall; and, no release agent, solid or liquid, remain on the tire liner's inner surface when the barrier film is removed.

Still further, since a substantial period of time may elapse before the cured tire is taken up in a production line to have a desired component adhesively secured to it, it is desirable that, before the tire is cured, the barrier film be secured to the virgin surface of the cured tire, whether it has an innerliner or not, sufficiently well that only a small force in the range from about 0.4 to 7.9 N/cm (1 to 20 N/inch) is required to remove the barrier film. Moreover, it is essential that, after the tire is cured, the barrier film remain on the innerliner and not fall off into the tire mold.

Part of the foregoing problem was addressed in U.S. Pat. No. 6,217,683 to Balzer et al taught a plastic or rubber sheet applied directly to a surface area on the inner surface of the tire in a bead area on either side of the tire prior to curing the tire. The plastic or rubber sheet has a smooth surface which provides a generally smooth area when forced into the inner surface of the tire during curing of the tire. Smooth sheet can be made using any suitable compound impermeable to silicon (sic). The sheet is removed after a given post-cure time to provide a conditioned, treated, clean and smooth surface area within the tire suitable for affixing the rubber ply to surface area. (see col 13, lines 38-49).

To begin with, a rubber sheet is inoperable as it cannot be removed from the innerliner after the tire is cured, as seen from the evidence relating to the Sandstrom U.S. Pat. No. 4,443,279, presented below. A usable "plastic" sheet must be thermally stable at curing temperature; if it is embedded in the cured virgin surface it is difficult to remove; if the sheet is not embedded either in the exterior surface of the carcass or in the innerliner, the sheet is likely to fall off in the mold when the tire is being removed. The disclosure of a "plastic sheet" is not an enabling disclosure.

Substantially the same problem was addressed in U.S. Pat. No. 4,443,279 issued to Sandstrom, who provided a barrier strip having a thickness in the range of about 0.025 to about 0.25 cm, the strip containing (a) 60 to 90 parts by weight uncured butyl rubber and correspondingly, (b) 40 to 10 parts by weight of an ethylene/propylene/nonconjugated diene terpolymer (EPDM) which contained 2 to 10 parts by weight of a tackifier resin; to this mixture was added conventional curing compounds. The co-cured strip is stated to have then been removed. Though, whether the integrity of the co-cured strip was maintained when it was removed, is unstated in the '279 patent, the data presented below indicate that when the illustrative example was duplicated the strip was not readily removable; it tore when it was being removed. Moreover, though the '279 strip is desirably stated to have a relatively low adhesion to the inside surface of a cured tire of less than about 1.8 Kg/linear cm (10 lb per linear inch), the data presented below indicate that the illustrative example does not meet the requisite specification for removability. Moreover, when one end of the cured strip overlaps the other, the ends become fused together upon curing and cannot form a pull-tab for manual removal. Further, since Sandstrom coated the interior of the cured tire with puncture sealant after the co-cured strip was removed, he did not have reason to compare the strength of bonds obtained between the surface of a rubbery article and conventionally cleaned and virgin surfaces respectively, irrespective of how the latter may be provided; he missed finding the advantage of maintaining a virgin surface.

One skilled in the art will know that, with the exception of a waxy release paper, films of numerous synthetic resinous compounds such as Mylar® polyester, Saran® vinyl chloride-co-vinylidene chloride, cellophane, polyurethane and polyolefins such as polyethylene (PE) and polypropylene (PP), can be "stitched" with varying degrees of success, onto the exterior of, or into the interior of a green tire because the uncured rubber is tacky enough to do so. Even a heavily cured (high cross-link density) strip of rubber may be stitched into, and remains positioned in the interior, though not reliably; and upon curing, the strip is readily removable, but it too-often tears in the mold because it does not expand sufficiently, and is usually removed in pieces; having been rent, it fails to protect the virgin surface from contamination by the bladder lube coated on the curing bladder. Further, if the curing bladder is not coated, it will adhere to the portions of the carcass where tears in the cured strip have occurred, damaging the bladder when the carcass is torn from it.

Even substituting a cured thin first strip for the uncured strip used by Sandstrom, fails to provide an effective barrier layer because the pre-cured strip tears upon removal. Substituting a less heavily cured (lower cross-link density) second strip which will not tear (and is more readily stitched into the interior of the green carcass than the cured), provides the necessary expansion and excellent protection when the tire is cured—but the second strip still adheres to the protected surface too tightly to be removed integrally, and cannot be easily removed.

An expectation that tailoring the composition of the green uncured strip with the "right" amount of curing compounds would yield, without undue experimentation, a readily removable strip which would not tear upon removal, was justified in view of the known difficulty of tightly adhering a rubbery surface to the cured surface of a butyl rubber innerliner having a conventional composition of isobutylene-based polymers, predominantly brominated butyl rubber optionally blended with one or more other rubbers. Such justification was unfounded.

As evidenced by the results presented below, a barrier film chosen from readily available films of precured and cured rubber, Mylar, Saran, polyurethane, cellophane, PE and PP was ineffective. Though thermally stable at curing temperature, Mylar and cellophane films wrinkle in the mold because they do not expand, and lining cement enters underneath. They are effective only when a portion of the innerliner is to be protected, provided the film stays in position. In practice, the film becomes dislodged and falls off in more than 10% of cured samples which is unacceptable. Saran®, PE and PP are thermally unstable. Hydrogen chloride generated by decomposition of Saran contaminates the mold. PE and PP films no thicker than 127 µm, 0.127 mm (5 mils) melt and fuse with the lining cement which contaminates the innerliner. A polyurethane strip less than 5 mils thick is too rubbery to pull out off the tire. If one end of a PE or PP strip, thick enough not to disintegrate, overlaps the other end in a curing tire, the overlapping end becomes fused to the strip and cannot provide a pull-tab to try and remove such portion of the strip which does not disintegrate.

SUMMARY OF THE INVENTION

Adhesion of a cured rubbery component to a virgin surface of rubber never contaminated by the remnants of a release agent (such remnants are left by solvent-cleaning or buffing the release agent off a cured innerliner surface to leave a cleaned surface), is several-fold stronger than a bond of the cured component to the contaminated, then "cleaned surface".

A virgin surface of a green tire carcass protected by a barrier film of this invention, is readily visually distinguishable over a "cleaned surface" irrespective of how it is cleaned. The virgin protected innerliner surface has a higher gloss than its "cleaned surface"; this is particularly evident in an innerliner in which a portion is protected and another portion which is cleaned.

Therefore, a pneumatic tire is provided with a virgin surface, protected against contamination by a release agent at the curing temperature of the tire, by a self-supporting barrier film of sulfur non-vulcanizable, expandable, thermoformable solid synthetic resinous material; and, a method is provided for maintaining a virgin cured surface on all or part of the exterior of, or, within all or part of the interior of a pneumatic tire's rubber carcass which is conventionally cured in a mold using an inflatable curing bladder, by protecting the virgin surface with a barrier film which is substantially inextensible with a force of 50 Newtons at ambient temperature (23° C.), and integrally removed from the interior of the cured tire carcass at about ambient temperature.

The method comprises contacting at least a portion of the exterior or interior virgin surface of a green tire carcass, whether it has an innerliner or not, with a non-elastomeric synthetic resinous barrier film having a thickness in the range from about 15 µm (0.60 mils) to 38 µm (1.5 mils), which is expandable, preferably biaxially, and formable in a temperature range of from about 121° C. (250° F.) to 200° C. (392° F.) in a curing press without tearing and without fusing to itself; applying the film to a chosen portion of the virgin interior surface, using enough pressure to removably adhere it to that portion; curing the green carcass; expanding the film in the curing carcass without tearing the film; and removing the film in an integral condition from the cured carcass. By "non-elastomeric" is meant that a strip of material when extended more than 50% of its original length does not return to its original length. Preferably the film is one which exhibits a "necking characteristic" at ambient temperature (23° C.) but is essentially inextensible with a force of 50 Newtons at the same temperature. By "necking characteristic" is meant that a force of greater than 50 Newtons will stretch a strip of barrier film 10 cm wide and 25.4 µm (1.0 mil) thick at least 10% at 23° C. at a cross-head speed of 50.8 cm/min (20 in/min). By "essentially inextensible" is meant that the film does not tear when it is being removed from the cured innerliner, and typically a force of 50 Newtons will not stretch a strip of barrier film 10 cm wide and 25.4 µm (1.0 mil) thick. Films which exhibit necking are less than 0.127 mm (5 mils) thick, preferably less than 50 µm (2 mils) thick, and selected from a fluorinated lower olefin having from 2 to 4 carbon atoms, poly(methylpentene) "PMP" and an unoriented or partially oriented polyamide, e.g. a nylon which is formed by condensation of a diamine and a dibasic acid, or by addition polymerization, or by ring opening polymerization of caprolactam. By "partially oriented" is meant that it's orientation allows it to neck to the extent necessary.

The foregoing method, when used to protect the innerliner, produces, after the film is removed, a cured tire with a virgin inner surface to which a balance pad or electronic monitoring device encapsulated in rubber, may be directly bonded more strongly than to a meticulously solvent-cleaned surface which was previously contaminated with release agent; the virgin inner surface may be that of an innerliner-free carcass, or, the virgin surface may be of the innerliner itself. The innerliner-free surface of the cured carcass is desirably spray-coated with a curable rubber compound which upon curing forms an innerliner having a thickness less than 0.0254 mm, 25.4 µm (1 mil). The exposed surface of the cured innerliner may then be coated with a puncture sealant.

The foregoing method, when used to protect the sidewalls, using a pair of annular rings of film, each the width of a sidewall, produces, after the rings are removed, a cured tire with virgin sidewall surfaces which do not have to be cleaned. This is particularly useful when making a non-black, particularly a white sidewall. The entire outer surface, including the tread may be protected with a film which envelops the entire exterior surface of a green carcass. Use of such an outer film for protection of the outer surface dispenses with using a release agent, thus avoiding fouling of the mold. Even if a release agent is used, protection of the surface of the mold from fouling caused by contact with the tire, is assured.

BRIEF DESCRIPTION OF THE DRAWING

The foregoing and additional objects and advantages of the invention will best be understood by reference to the following detailed description, accompanied with schematic illustrations of a preferred embodiment of the invention as well as an embodiment in which illustrations like reference numerals refer to like elements, and in which.

DETAILED DESCRIPTION OF PREFERRED EMBODIMENTS

Most preferred are nylon films. Examples of nylons which may be formed into film are linear polycondensates of lactams of 6 to 12 carbon atoms and conventional polycondensates of diamines and dicarboxylic acids, e.g. nylon 6,6; nylon 6,8; nylon 6,9; nylon 6,10; nylon 6,12; nylon 8,8 and nylon 12,12. Further examples to be mentioned are nylon 6, nylon 11 and nylon 12, which are manufactured from the corresponding lactams. In addition, it is possible to use polycondensates of aromatic dicarboxylic acids, e.g., isophthalic acid or terephthalic acid, with diamines, e.g., hexamethylenediamine, or octamethylenediamine, polycarbonates of aliphatic starting materials, e.g., m- and p-xylylenediamines, with adipic acid, suberic acid and sebacic acid, and polycondensates based on alicyclic starting materials, e.g. cyclohexanedicarboxylic acid, cyclohexanediacetic acid, 4,4'-diaminodicyclohexylmethane and 4,4'-diaminodicyclohexylpropane.

Figure 1:
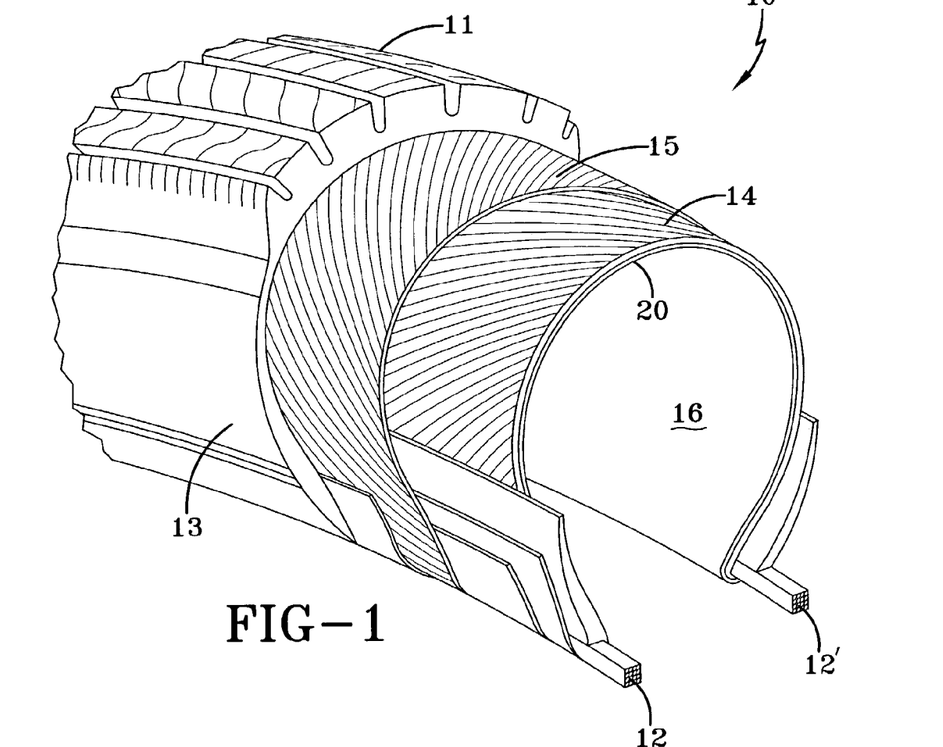
FIG. 1 is a schematic illustration in a perspective view, not to scale, of a green tire carcass with a strip of barrier film long enough to provide a "pull-tab", stitched into the innerliner to provide a band of cured virgin innerliner surface within any portion of which a rubbery component may be adhesively secured after the film is removed.

Construction of Green Tire Carcass with Innerliner Fully Protected:

Referring to FIG. 1 which illustrates a first embodiment of the invention, there is schematically shown a cross-section of a toroidal tire carcass, referred to generally by reference numeral 10, comprising a circumferential tread 11, spaced beads 12, 12' and connecting sidewall portions 13, 13' (not visible) extending between the tread and beads, to form a conventional cross-bias tire. The carcass 10 includes plural belts 14, 15 overlying one another, each having spaced apart parallel reinforcing cords at predetermined angles relative to one another. The inner surface of the innermost belt 14 is lined with a rubber innerliner 16 which is substantially gas-impermeable. Removably adhered to the innerliner 16, directly beneath the tread where it would contact the road, is a barrier film 20 shown overlying the entire surface of the innerliner and extending over the beads to ensure a fully protected virgin surface. The components of the tire are assembled on a tire-building drum, the innerliner being the first component positioned on the drum.

Figure 2:
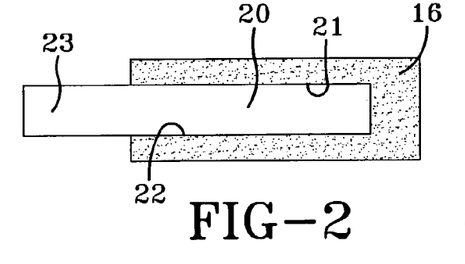
FIG. 2 is a plan view, not to scale, of an assembly of a strip of barrier film long enough to overlie the entire circumferential surface of a rolled sheet of innerliner, and also provide a "pull-tab", stitched into a sheet of innerliner before the innerliner is positioned on a building drum.

As illustrated in FIG. 2, prior to the innerliner 16 being positioned on the building drum, a strip of barrier film 20 having a width substantially corresponding to the width of the tread which contacts the road, is positioned symmetrically about the longitudinal central axis of the innerliner 16 and the edges 21, 22 of the strip are stitched to the surface of the innerliner causing the strip to be removably adhered to the innerliner. Preferably there is an overhang or "overlap" 23, sufficient to afford a pull-tab, to facilitate removal of the film after cure.

Figure 3:
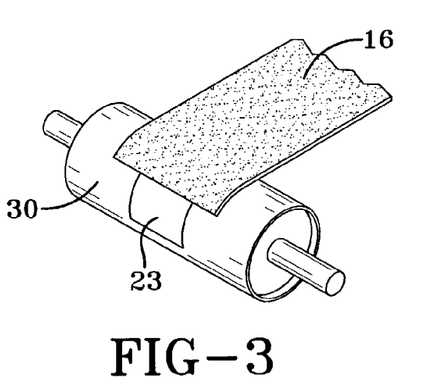
FIG. 3 is a perspective view schematically illustrating positioning of a prepared innerliner (as shown in FIG. 2) on a tire building drum.

As shown in FIG. 3, from about 2 cm to 20 cm of one end of the nylon strip 20 extends beyond one end of the innerliner as it is positioned on the drum 30, to form the overlap 23. The overlap 23 may additionally be provided with a thermally stable tab having a non-stick pull-tab end portion. To facilitate visual detection through the lining cement, the overlap 23 may be colored so as to contrast with the black of the innerliner or green carcass.

The green carcass 10 is removed from the drum and stored with the barrier film 20 protecting the surface of the innerliner. Several days later, the barrier film 20 is found to have remained in its original position in the green tire carcass. The interior of the carcass is sprayed with lining cement which completely covers the film, and the carcass is placed in a curing press to be conventionally cured. The cured carcass is removed from the press and the film is manually removed in one piece, by pulling on the protruding end of film. The virgin surface beneath the film is exposed.

Green Carcass with Post-positioned Barrier Film Fully Protecting the Innerliner:

As a less satisfactory alternative to the method described above, a strip of barrier film having a width substantially corresponding to the width of the tread, is inserted into the carcass and positioned symmetrically about the circumferential center line of the innerliner, gently pressing the film against the innerliner, so that it is adherently secured to the innerliner, preferably leaving an overhang, as before. The circumferential edges of the strip are then stitched to the surface of the innerliner. The interior of the green carcass with the barrier film in position is then spray-coated with lining cement and the tire cured as before. When the film is removed, a virgin surface is exposed which is substantially indistinguishable from the virgin surface produced by the prior method of building the tire with the barrier film pre-positioned on the inner-liner, but the latter method is both less cumbersome and less time-consuming.

Figure 4:
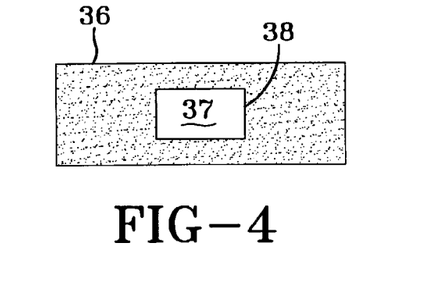
FIG. 4 is a plan view, not to scale, of an assembly of a strip of barrier film covering only a portion of a sheet of innerliner, stitched into its surface before the innerliner is positioned on a building drum.

Green Carcass with Barrier Film Fully Protecting Only Portion of the Innerliner:

As illustrated in FIG. 4, in the event that only a portion of the innerliner 36 is to be protected, as for example, when a patch 37 of virgin surface is sufficient for the purpose at hand, a sheet of barrier film 38 is superimposed on the chosen patch 37 and all the edges stitched into the innerliner 36. The innerliner is then positioned on the building drum (not shown) and construction of the tire carcass is completed in the usual manner. The tire is then removed from the building drum, sprayed with lining cement and cured. Upon cooling, the film 38 is readily removed with a force no greater than 50 Newtons, preferably less than 30 Newtons.

It will be evident that, where only a patch of virgin surface is required, the barrier film may be post-positioned, that is, stitched over the chosen patch of innerliner after the green tire is constructed in a conventional manner.

Construction of Green Tire Carcass with no Innerliner:

A green tire carcass is constructed in a manner analogous to that described above, except that no innerliner is used. The first belt 14 provides the inner surface of an inner-liner-free carcass. In a manner analogous to that described for prepositioning the barrier film on the innerliner, the barrier film is positioned symmetrically about the longitudinal axis of the first belt 14 and the edges of the film stitched to the rubbery belt. The first belt 14 is then positioned on the building drum so as to provide a pull-tab of film, and construction of the carcass completed in the usual manner. The interior of the green carcass, with the barrier film in position on the innermost belt, is then spray-coated with lining cement and the tire cured as before. The cured carcass is removed from the press and the film is manually removed in one piece, by pulling on the protruding end of film. The virgin surface of the innermost belt beneath the film is exposed.

Curing Without the Use of a Release Agent:

Irrespective of whether the green carcass has an innerliner, and whether the film is pre-positioned on the innerliner or post-positioned, if the width of the barrier film is sufficient to extend over the entire inner surface of the carcass, as shown in FIG. 1, the carcass with barrier film may be loaded in the curing press without using any release agent, that is, without lining cement inside the carcass, or bladder lube on the curing bladder. The barrier film conforms to the inner surface of the cured tire as it expands in the curing mold, and the film maintains its generally toroidal form even when cooled. When the film is removed, the virgin surface of the cured carcass, cured in a "release-agent-free" curing mold, is indistinguishable from another virgin surface which, though protected with a barrier film, used a release agent used to coat either the bladder or the interior of the carcass.

Applying an Innerliner in a Cured Carcass:

The entire interior of the cured carcass, obtained with a virgin surface as described above, is spray-coated with an essentially gas-impermeable elastomeric layer having a thickness in the range from about 0.01 mm, 10 µm to about 0.762 mm (30 mils), preferably in the range from about 0.025 mm, 25 µm to about 0.125 mm (5 mils); preferred is an aqueous dispersion of butyl rubber filled with exfoliated vermiculite having a very large aspect ratio, as disclosed in "Elastomeric barrier coatings for sporting goods" by Goldger, Harris et al, pg 15 et seq., in Rubber World, August 2002 and U.S. Pat. Nos. 5,807,629; 6,087,016 and 6,341,747. If desired the spray coating may be applied to the interior surface of the green carcass before it is cured, and upon solidifying, is protected by the protective films of this invention.

Manufacturing a Pneumatic Aircraft Tire for Incorporation of a Rubbery Component:

A cured aircraft tire having an innerliner with its entire circumferential inner surface directly underneath the tread free from contamination by any release agent commonly used in the curing of a tire in a curing press, is prepared as described above and illustrated by the following example. Unless otherwise indicated, all parts and percentages are by weight.

EXAMPLE 1

1A. A bias PBI 22×6.75-10 (22", 55.9 cm×6.75", 17 cm-10", 25.4 cm) 8 ply rating aircraft pneumatic rubber tire (first tire), with a glossy innerliner compounded from 90% bromobutyl rubber and 10% butyl rubber, is built on a drum by first positioning a commercially available continuous strip of thin clear unoriented 6,6-nylon film, 9.5 cm (3.75") wide and 19 µm (0.75 mils) thick, symmetrically about the longitudinal axis of an innerliner so that from about 2 cm to 5 cm of one end of the nylon strip extends beyond one end of the innerliner as shown in FIG. 2, to provide protection for the entire virgin surface of the innerliner. The opposed longitudinal edges of the nylon strip are stitched into the innerliner with a conventional stitching roller so that the strip and innerliner form a readily-handled assembly. The assembly is circumferentially positioned around the drum with the nylon strip in direct contact with the drum's surface, and a portion of one end of the nylon sheet overlapping the other, preferably sufficiently to provide for requisite expansion of the tire and a pull-tab, ensuring that the nylon film does not interfere with splicing of the innerliner. The remaining belts of the tire are positioned onto the building drum and the construction of the tire carcass with a ground contacting tread, spaced beads and connecting sidewalls, is completed in the usual manner.

When the green tire, whether it has an innerliner or is innerliner-free, is removed from the building drum it is distinguishable from a conventional green carcass by the removably adhered barrier strip circumferentially positioned on the inner surface directly under the tread as shown in FIG. 1.

Comparison of "Virgin" and "Buffed and Solvent-cleaned" Innerliner Surfaces:

Several different films are tested to determine the strength of their adhesion to a surface of an innerliner in a series of cured bias ply aircraft tires, the compound for the innerliner being the same in all cases. In each case the film is substantially longer than the circumference of the green carcass and wider than required to closely fit the surface of the innerliner, is stitched to the innerliner so that the sides of the strip extend over the beads on each side of the carcass. The entire virgin surface of the innerliner is thus protected. One end of the strip overlaps the other to afford a pull-tab.

The strip is spray-coated with a white silicone-and-mica lining cement, and the tire is placed in a cavity defined by upper and lower halves of the mold which, in turn, is placed in a curing press. A typical curing press uses high pressure external steam to heat the mold by flowing the steam externally over the mold. In addition to being heated externally with steam flowed over the mold, it is heated internally with an internal heating medium such as high pressure steam flowed through a curing bladder. Optionally, the curing bladder may also be coated with another, or the same, white silicone-containing bladder lube. After the bladder expands sufficiently to force the green tread into the patterned interior surface of the mold, and the carcass has received a required number of cure equivalents sufficient to complete the desired cure, steam to the press and the bladder is shut off, the bladder deflated and the press is opened. A "cure equivalent" is defined as one minute of curing time at a constant reference temperature, usually 138° C. (280° F.). Each tire is cured at 150° C. for 38 min.

Tested first in a first tire, is the film of choice, an expandable Dartek® 6,6-nylon film having a thickness of 19 µm (0.75 mil).

The cured first tire, removed from the press, is visually substantially identical to to the green tire with the 6,6-nylon strip in position, which was placed in the mold, except that the surface of the 6,6-nylon strip, coated with lining cement, is wrinkled and relatively less smooth than the strip's surface was before the tire was cured. The film was biaxially stretched because the circumferential length of the cured innerliner was about 30% greater than its length before it was cured, and the film adhered to the surface of the innerliner and remained draped over the beads of the tire. Thus, to ensure that the entire virgin surface of the innerliner is not contaminated, the preferred film of choice is an amorphous synthetic resin which is expandable in at least two directions, and which upon being heated to curing temperature, has sufficient tensile strength to be pulled off the cured innerliner to which it remains adhered.

The Dartek® 6,6-nylon strip adhering to the innerliner is manually removed as an integral continuous strip, exerting a force of less than 30 Newtons, to reveal a glossy virgin surface of innerliner, free of any release agent, as the strip is impermeable to the lining cement. When the barrier strip is removed, the protected virgin surface is visually glossier than a thoroughly cleaned (by buffing and solvent) surface which was allowed to be contaminated.

T-peel test adhesion for Dartek® film which remained adhered to the innerliner is 57 N/cm (145 N/inch). An Instron 5569 tensile tester is used in a Series IX Automated Materials Testing System.

A strip of unoriented 6-nylon film, 19 µm (0.75 mil) thick, commercially available as Capron® nylon from Honeywell Corp. yielded substantially the same results as the unoriented Capron® 6,6-nylon.

Another bias ply aircraft green tire of the same size (second tire) with the same 90% halobutyl and 10% butyl rubber innerliner, unprotected by a barrier film, is conventionally cured in the same press under the identical conditions using the same white lining cement and bladder lube. A reading on the release-coated innerliner is taken with the gloss meter. The cured tire is thereafter thoroughly buffed with a wire brush in combination with solvent until deemed clean enough to adhesively secure a balance pad. The solvent is typically a major proportion of heptane and a minor proportion of toluene and one or more ketones. A reading on the "cleaned surface" is taken with the gloss meter. Because the lining cement is white the gloss meter reads a higher value for the lining-coated innerliner than the reading for the "cleaned surface".

Successive additional bias ply tires (third, fourth, et seq.) identically constructed and with the same innerliner compound, have the entire surfaces of their innerliners protected by films of different polymers, each identically coated with lining cement and cured. The protective films are removed and the gloss of each cured innerliner is measured.

The gloss of the virgin cured surface of the first tire, protected by the barrier film, is compared to that of the buffed and solvent-cleaned "cleaned surface" of the second tire, and also compared to the gloss of the original virgin uncured surface, by measuring with an Erichsen Pico Glossmeter Model 500, the calibration plate for which has a gloss reading of 93%. The results are presented below:

|  | Meter Reading, % |
|---|---|
| First tire - virgin uncured innerliner surface ("ILS") | 22.8 |
| First tire - vir'n cured ILS prot'ed by Dartek 6,6-nylon | 14.6 |
| Second tire - contaminated ILS before cleaning | 3. |
| Second tire - "cleaned surface" | 0.3 |
| Third tire - vir'n cured ILS prot'ed by cellophane** | 27.2 |
| Fourth tire - vi'in cured ILS urface prot'ed by polyethylene■ | 11.7 |
| Fifth tire - vir'n cured ILS prot'ed by PTFE Teflon | 0.8 |
| Sixth tire - vir'n cured ILS prot'ed by FEP Teflon | 25.3 |
| Seventh tire - vir'n cured ILS prot'ed by 30NH Kapton* | 11.8 |
| Eighth tire - vir'n cured ILS prot'ed by Capron Nylon | 17.9 |
| Ninth tire - vir'n cured ILS prot'ed by Capron Emblem** | 17.9 |
| Tenth tire - vir'n cured ILS prot'ed by polymethylpentene | 15. |

■fuses
*aromatic polyimide, tears in mold
**tears in mold

It is evident that the "virgin cured surface" has a gloss number at least an order of magnitude (multiples of ten) greater than the "cleaned surface", except for the cured surface protected by polytetrafluoroethylene (PTFE) film. However, fluorinated ethylene propylene polymer (FEP) provides a glossier surface than the virgin uncured surface, as does preoriented Capron Emblem 6-nylon which is not acceptable for maintaining the innerliner's entire surface a virgin surface because being preoriented, it does not stretch enough for a highly expandable bias ply aircraft tire.

Any portion of the virgin cured surface may now be directly coated with an adhesive conventionally used to secure a rubbery tire component to the coated surface.

Figure 5:
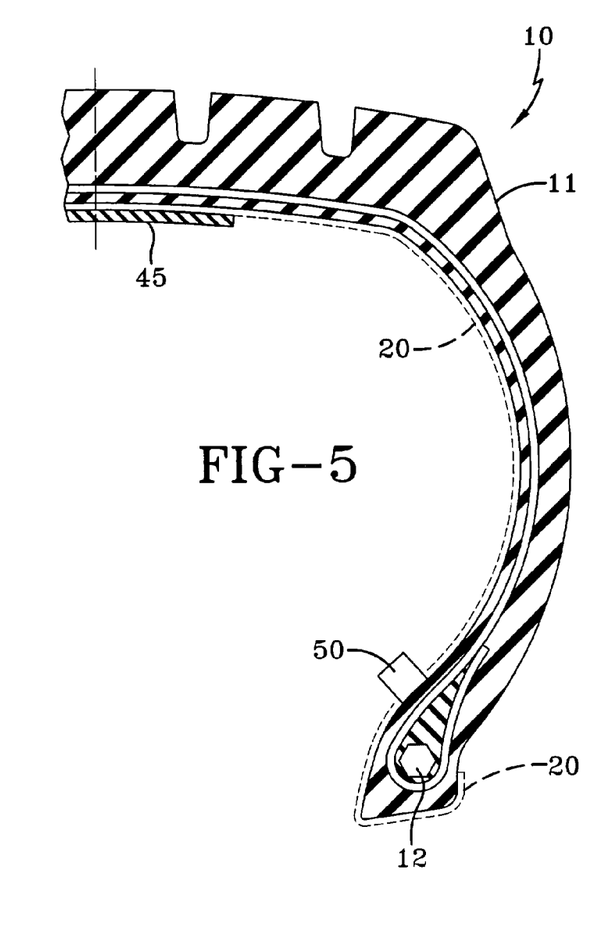
FIG. 5 is partial cross-section of a tire having a sheet of barrier film in phantom view because the film is removed after the tire is cured so that an electronic monitoring device may be secured to its sidewall, and a balance pad may be secured to the innerliner underneath the tread.
Figure 6:
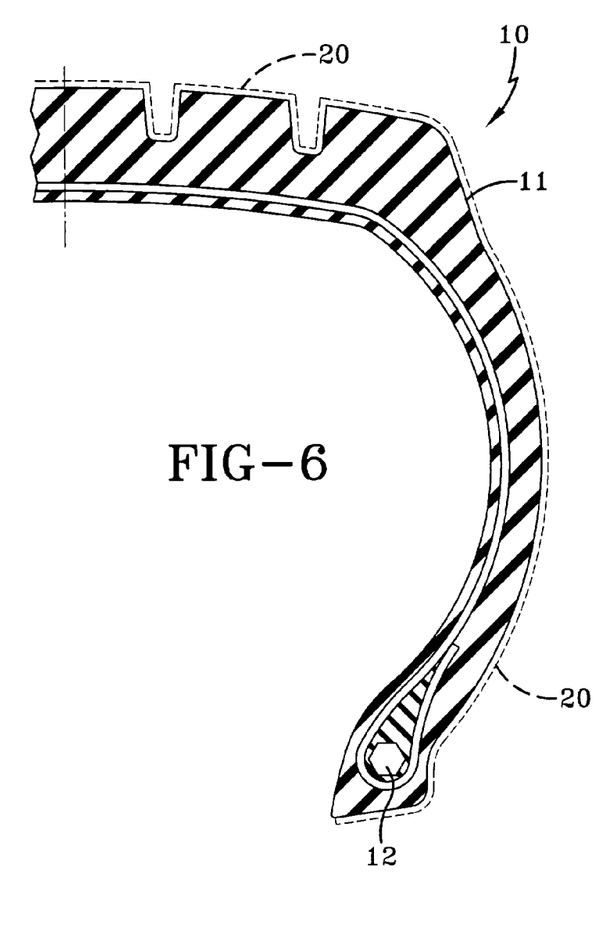
FIG. 6 is partial cross-section of a tire having a sheet of barrier film overlying the exterior of the cured tire carcass, keeping the virgin surfaces of the sidewalls and tread.

B. Securing a Balance Pad:

In a particular example, the first cured aircraft tire, with a virgin inner surface left by the removed 6,6-nylon strip, is mounted on a balancing machine to determine balancing requirements, and provides information that the tire is to have a "balance pad" weighing 56.7 gm (2 oz), integrally assembled in a specific location on the circumference of the innerliner. As illustrated in FIG. 5, an adhesive, such as a "fast dry cement" believed to be a solution of zinc-dibutyl dithiocarbamate/dibutylamine complex in a major proportion of heptane and a minor proportion of a ketone such as acetone, conventionally used for the purpose and commercially available from Patch Rubber Co., is coated on the surface of the innerliner at the specified location and the balance pad 45 tightly pressed onto the coated surface and allowed to cure at ambient temperature for about three days. The balance pad is secured non-removably, that is, cannot be removed without destroying the innerliner.

The strength of the adhesive bond obtained with a 90% bromobutyl rubber, 10% butyl rubber inner liner protected to varying extents by barrier films of different polymers, is presented below, measured after a balance pad (50 gm, 1.75 oz) is secured to the protected innerliner with the same adhesive:

| Film used | Adhesion, N/cm (N/inch) |
|---|---|
| Mylar polyester | 67 (170) |
| Teflon PTFE | 60 (152) |
| Dartek 6,6-nylon | 57 (145) |
| Cellophane | 63 (160) |
| FEP[1] | 53 (135) |

[1]flourinated ethylene propylene polymer

From the above it is evident that the virgin surface protected by the Mylar film provided the best bond, except that the film is unusable for the purpose at hand because it is essentially inexpansible to the degree required under conditions in a curing mold. In each case, a bond having a strength greater than about 40 N/cm (100 N/inch) results in tearing of one or the other adhered surfaces indicating a cohesive bond.

C. Providing a Tire with a Puncture Sealant:

In another example, the virgin surface is spray-coated with a sufficient amount of a flowable sealant composition conventionally used to provide a self-sealing tire which affords protection against being punctured so as to lose air from within the tire. A typical sealant composition comprises a butyl/polyisobutylene rubber, curative (or crosslinker) and solvent. The inflated tire does not lose air during operation of the tire over 100 hours.

D. Substituting a Polyester Film for the 6,6-nylon:

In another example, a strip of Mylar film having the same width and thickness as the 6,6-nylon film used in Example 1A above, is substituted for the 6,6-nylon film in the construction of a green tire with an innerliner essentially identical to the tire constructed in 1A, and the tire coated with release agent and cured in an identical manner as the tire in 1A. Upon opening the curing mold the Mylar film is found to have wrinkled and torn, and lining cement contaminated the innerliner.

E. Substituting a Polyurethane Film for the 6,6-nylon:

A polyurethane film, PS3111, 7 gauge thickness, obtained from Deerfield Urethane is used in a manner analogous to that described for the Mylar film. The ends of the film forming the pull-tab fused.

In another example, a polyurethane film, PT6311, 10 gauge thickness, obtained from Deerfield Urethane is used in a manner analogous to that described for the Mylar film. The ends of the film forming the pull-tab fused.

F. Substituting an Aromatic Polyimide Film for the 6,6-nylon:

In yet another example a barrier film of a commercially available aromatic polyimide having the same width and thickness as the 6,6-nylon film is substituted for the 6,6-nylon film, all other components of the tire and conditions of its curing being kept the same.

The polyimide film is prepared by the reaction of an aromatic tetracarboxylic acid with an aromatic diamine component to yield the polyimide which may be reacted with water to yield the polyamic acid. A solution of either the polyimide or polyamic acid in an appropriate solvent may then be used to produce a film whether by casting into sheets, or by extrusion through a die and evaporating the solvent from the cast or extruded film.

30NH Kapton aromatic polyimide film from DuPont about 0.0254 mm (1 mil) thick is substantially inextensible. A strip of the film having the same dimensions as the 6,6-nylon strip used above is used as a barrier film on an innerliner to be cured. Though the pull-tab does not fuse to the film, the film tears in the mold because it does not expand sufficiently.

T-peel test adhesion for film which remained lightly adhered to the innerliner is 1.4 N/cm (3.59 N/inch).

G. Substituting a "Tailored" Curable Rubber Strip for the 6,6-nylon:

The rubber compound of the Sandstrom '279 patent is duplicated and calendered into a sheet 0.38 mm (15 mil) thick. A strip wide enough to cover the innerliner, and long enough to form a pull-tab, is cut from the sheet and stitched to a green innerliner of a carcass and cured for 28 min at 150° C. The pull-tab fused to the underlying strip and when pulled hard with a force greater than 30 N, broke. Moreover, the strip was fused to the innerliner so that the strip tore when it was removed. The pull-tab broke when a force of 26.6 N/cm (67.6 N/inch) was exerted.

H. Substituting a Polytetrafluoroethylene (PTFE) Strip for the 6,6-nylon:

A PTFE strip, 3 mils thick is used as the barrier film in a manner analogous to that described in 1F above. The strip afforded excellent protection for the virgin cured surface. The pull-tab end remained free and is used to pull the strip off manually without tearing the strip.

I. A strip of fluorinated ethylene propylene polymer, commercially available as 100A FEP-Teflon film, 3 mils thick is used as the barrier film in a manner analogous to that described in 1F above. The strip afforded excellent protection for the virgin cured surface. The pull-tab end remained free and is used to pull the strip off manually without tearing the strip.

T-peel test adhesion for FEP film which remained lightly adhered to the innerliner is 0.65 N/cm (1.64 N/inch).

J. A strip of oriented 6-nylon film, 1 mil thick, commercially available as Capron® Emblem from Honeywell is used as the barrier film in a manner analogous to that described in 1F above. The strip failed to stretch sufficiently in the mold and tore into large pieces, but each of the pieces is readily removable without further tearing. The pull-tab end remained free and is used to pull the piece of the strip to which it was attached.

K. A strip of unoriented 6-nylon film, 1 mil thick, commercially available as Capron® Nylon from Honeywell is used as the barrier film in a manner analogous to that described in 1F above. The strip stretches sufficiently in the mold and is readily removable integrally. The pull-tab end remained free and is used to pull the strip off manually without tearing it. T-peel test adhesion for the film which remained lightly adhered to the innerliner is 4.13 N/cm (10.51 N/inch).

L. A strip of unoriented PMP Release film, 2 mils thick, commercially available as PMP MX002 from Honeywell is used as the barrier film in a manner analogous to that described in 1F above. The strip stretches sufficiently in the mold and is readily removable integrally. The pull-tab end remained free and is used to pull the strip off manually without tearing it. T-peel test adhesion for the film which remained lightly adhered to the innerliner is 0.63 N/cm (1.6 N/inch).

EXAMPLE 2

Comparison of Adhesive Strength Of Balance Pads Cured To A "Cleaned Surface" and to a "Virgin Cured Surface":

To compare the strength of the adhesive bonds, identical balance pads were adhesively secured with the same "fast dry cement" to cleaned surfaces of cured innerliners, and to a virgin cured surface, and all were cured for about three days at room temperature (23° C.).

A. Innerliners of 80% bromobutyl rubber and 20% natural rubber are protected by each of two different effective barrier films before the tire is cured. Though Mylar film is not acceptable for use in this invention, it provides an effective barrier against release agent. The test is to determine the effect of maintaining a virgin cured surface, irrespective of how it is maintained. Before the tire is cured, the barrier film is coated with Lyndcoat® DV silicone-containing release agent:

Test sample A1: the barrier film is of 6,6-nylon, 19 μm (0.75 mil) thick.

Test sample A2: the barrier film is of Mylar, 19 μm (0.75 mil) thick.

B. An innerliner of the same composition as above, is cured after it is coated with the same release agent used above; the cured innerliner is then thoroughly cleaned manually with the following commonly-used solvents:

Test sample B1: buffed with wire brush and cleaned with 80:10:10, heptane, acetone, toluene
Test sample B2: cleaned with hexane
Test sample B3: cleaned with toluene The results are set forth in Table 1 below:

TABLE 1

| Sample Surface | Bond, N/cm (N/inch) |
| --- | --- |
| A1: virgin, 6,6-nylon protected | 79.9 (203) |
| A2: virgin, Mylar protected | 82.7 (210) |
| B1: cleaned, 80:10:10 | 22.4 (57) |
| B2: cleaned, hexane | 25.6 (65) |
| B3: cleaned, toluene | 26 (66) |

It is evident that the adhesive bond of the balance pad to the virgin surface is more than three times greater than that of any of the cleaned surfaces, indicating that the trace amount of release agent left on the cleaned surfaces greatly weakens the bond. As an alternative, if buffed clean with a wire brush, the resulting rough surface impairs bond strength of the adhesive.

EXAMPLE 3

How the Barrier Film Affects Adhesion of Balance Pads with Different Adhesives:

In a manner analogous to that described in Example 1 above, a green P255/60R16 automobile tire carcass is built on a building drum in the conventional manner and a strip of 6,6-nylon film, about 9.5 cm (3.75") wide is stitched into the innerliner before it is placed on the building drum, so as to provide an annular ring in the cross direction on the inner surface of the innerliner, directly underneath the tread of the completed carcass. One end of the strip overlaps the other affording a pull-tab for ease of removal of the strip. To readily find the pull tab in the cured tire, a 5 cm×9.5 cm piece of white poly(vinyl chloride) (PVC) tape with pressure-sensitive adhesive on one side is attached to the overlapping end of the strip so that the tape is adhesively secured to the underlying nylon film. As before, the interior of the carcass is spray-coated with lining cement, the carcass cured and the nylon film removed intact.

Two sets, each with three balance pads in it, are tested, each of the three pads having a different commercially available gray face gum adhesive, identified as P, Q and R, used for the purpose at hand, the composition of which is not known. Both sets of pads were adhesively secured to the virgin cured innerliner surface, spaced-apart one from the other, and cured for three days at room temperature. The results for two pads in each set are averaged and set forth in Table 2 below in which N/inch is given in parenthesis:

TABLE 2

| Adhesive | N/cm, Pad #, Set # | N/cm, Pad #, Set # | N/cm (Avg) |
| --- | --- | --- | --- |
| P | 65.5 (166) 1, 1 | 70.5 (179) 2, 1 | 67.9 (172.5) |
| Q | 201 (79.1) 1, 2 | 79.5 (202) 2, 2 | 79.33 (201.5) |
| R | 19.3 (49) 1, 3 | 29.5 (75) 2, 3 | 24.4 (62) |

P refers to FCFGG Gray commercial adhesive from Patch Rubber Company
Q refers to XFCFGG Gray experimental adhesive from Patch Rubber Company
R refers to Gray adhesive from Rubernew, Brazil.

It is evident from the above that the bond of each pad to the inner surface is about the same irrespective of its position on the cured innerliner, indicating that the adhesive characteristics of the virgin surface is uniform over the entire protected surface of the innerliner.

EXAMPLE 4

Adhesively Securing a Monitoring Device to the Sidewall of a Cured Tire:

In a manner analogous to that described in Example 1 above, a green P255/60 R16 passenger tire carcass is built on a building drum in the conventional manner except that one of the two circle-shaped sidewalls of uncured rubber has an annular planar strip of 6,6-nylon film, about 9.5 cm (3.75") wide stitched into the inner surface of the sidewall before the sidewall is built into the carcass on the building drum.

As before, one end of the annular strip overlaps the other to allow for expansion of the tire and to afford a pull-tab for ease of removal of the strip. Also as before, the interior of the carcass is spray-coated with lining cement, the carcass is cured and the barrier film removed.

An electronic monitoring device including an antenna and actively connected circuitry are encapsulated in an annular ring of rubber and cured at a temperature insufficient to deleteriously affect the performance of the monitoring device. As illustrated in FIG. 5, the annular ring 50, which is of generally rectangular cross-section and has a diameter approximately corresponding to the diameter of the sidewall, has one surface which is about 0.8 cm (0.325 in) wide and substantially planar so as to be adhesively secured to the virgin surface of the sidewall of the tire, just above the bead 12' after the barrier film 20 has been removed. As shown, the barrier film 20 is sufficiently wide so that it overlies the entire inner surface of the innerliner and extends beyond and over the beads on either side. The planar surface of the annular ring is coated with a fast-dry cement, then with a gray face gum typically used in a balance pad assembly, and finally with another coating of fast-dry cement. The annular ring is then pressed onto the sidewall just beneath the bead and allowed to cure for about three days at ambient temperature.

Upon cutting the tire to measure the strength of the adhesive bond between annular ring and sidewall, the bond was found to have an adhesive strength of 93.3 N/cm (237 N/in).

While certain representative embodiments and details have been shown for the purpose of illustrating the invention, it will be apparent to those skilled in this art that various changes and modifications may be made therein without departing from the spirit or scope of the invention.

What is claimed is:

1. A method of balancing a pneumatic rubber tire which comprises the steps of:
    (A) providing a cured pneumatic rubber tire having a release coating-free circumferential inner surface;
    (B) determining at least one specific location on the circumference of said release coating-free circumferential inner surface of said cured pneumatic rubber tire for placement of at least one rubber balance pad to balance said pneumatic rubber tire;
    (C) adhesively positioning and securing at least one rubber balance pad at said specific location on said circumference of said release coating-free circumferential inner surface of said cured tire;
    wherein said release coating-free circumferential tire inner surface is prepared by:
    (a) providing an uncured pneumatic rubber tire having an inner surface;
    (b) placing an annular strip of multi-axially stretchable polyamide film on a circumferential surface of said inner surface with one end of said strip overlays the other end of said strip to create a pull tab for removal of said strip from said inner surface, wherein said polyamide film:
        (i) has a thickness in a range of from about 15 μm to about 38 μm;
        (ii) is formable in a temperature range of from about 121° C. to about 200° C. without tearing and fusing to itself; and
        (iii) is non-elastomeric in a sense of not returning to its original length when stretched more than 50 percent of its original length at 23° C.;
    (c) applying a release agent coating to said annular, circumferential film strip and said inner surface of said uncured tire;
    (d) shaping and curing said uncured tire with said release coating on said annular circumferential film strip and inner surface in a suitable mold at an elevated temperature;
    (e) removing the cured tire from the mold and allowing the cured tire to cool; and,
    (f) removing said annular circumferential film strip with its release coating by use of said pull-tab to provide a circumferential release coating-free tire inner surface of said cured tire.

* * * * *